US011318609B2

(12) United States Patent
Takeuchi et al.

(10) Patent No.: US 11,318,609 B2
(45) Date of Patent: May 3, 2022

(54) CONTROL DEVICE, ROBOT SYSTEM, AND ROBOT

(71) Applicant: Seiko Epson Corporation, Tokyo (JP)

(72) Inventors: Kaoru Takeuchi, Azumino (JP); Nobuhiro Karito, Kiso (JP); Isamu Sejimo, Azumino (JP)

(73) Assignee: Seiko Epson Corporation

( * ) Notice: Subject to any disclaimer, the term of this patent is extended or adjusted under 35 U.S.C. 154(b) by 331 days.

(21) Appl. No.: 16/545,114

(22) Filed: Aug. 20, 2019

(65) Prior Publication Data

US 2020/0061817 A1   Feb. 27, 2020

(30) Foreign Application Priority Data

Aug. 21, 2018 (JP) .............................. JP2018-154380

(51) Int. Cl.
*B25J 9/16* (2006.01)
*B25J 13/08* (2006.01)

(52) U.S. Cl.
CPC ........... *B25J 9/1633* (2013.01); *B25J 13/085* (2013.01)

(58) Field of Classification Search
CPC ........ B25J 9/1633; B25J 13/085; B25J 9/161; B25J 19/02
USPC ................................................ 700/245–264
See application file for complete search history.

(56) References Cited

U.S. PATENT DOCUMENTS

| 7,212,886 | B2 * | 5/2007 | Nagata | .................. | B25J 9/1633 |
| | | | | | 318/568.12 |
| 9,114,530 | B2 * | 8/2015 | Tsusaka | ................. | B25J 9/1656 |
| 9,211,646 | B2 * | 12/2015 | Tsusaka | ................. | B25J 9/1687 |
| 9,724,825 | B2 * | 8/2017 | Iwatake | ................. | B25J 9/1687 |
| 2002/0056181 | A1 * | 5/2002 | Sakakibara | ............ | B25J 9/1687 |
| | | | | | 29/407.01 |
| 2004/0128030 | A1 * | 7/2004 | Nagata | .................. | B25J 9/1633 |
| | | | | | 700/245 |
| 2011/0029133 | A1 * | 2/2011 | Okazaki | ............... | B25J 19/0004 |
| | | | | | 700/258 |
| 2011/0190932 | A1 * | 8/2011 | Tsusaka | .................. | B25J 13/08 |
| | | | | | 700/254 |
| 2012/0083920 | A1 | 4/2012 | Suyama et al. |
| 2013/0245821 | A1 | 9/2013 | Nakamura et al. |

(Continued)

FOREIGN PATENT DOCUMENTS

| JP | 2012-076805 A | 4/2012 |
| JP | 2013-193147 A | 9/2013 |
| JP | 2018-062050 A | 4/2018 |

OTHER PUBLICATIONS

N. Hogan, "Impedance Control: An Approach to Manipulation," 1984, IEEE, American Control Conference, pp. 304-313, doi: 10.23919/ACC.1984.4788393. (Year: 1984).*

(Continued)

*Primary Examiner* — Jaime Figueroa
(74) *Attorney, Agent, or Firm* — Harness, Dickey & Pierce, P.L.C.

(57) ABSTRACT

A control device includes a control unit which executes a control force to a movable unit according to an output of a force detection unit. The control unit executes a stop control of the movable unit when a predetermined stop condition is satisfied. The stop control includes a second control which continues the force control to control the movable unit when the stop condition is satisfied during the execution of a first control including a force control.

11 Claims, 15 Drawing Sheets

(56) References Cited

U.S. PATENT DOCUMENTS

| | | | | |
|---|---|---|---|---|
| 2013/0310977 | A1* | 11/2013 | Tsusaka | B25J 9/163 |
| | | | | 700/257 |
| 2016/0016314 | A1* | 1/2016 | Hietmann | B25J 9/1674 |
| | | | | 700/245 |
| 2016/0354925 | A1* | 12/2016 | Shimodaira | B25J 9/1664 |
| 2017/0008171 | A1* | 1/2017 | Iwatake | B25J 9/1687 |
| 2017/0296177 | A1* | 10/2017 | Harris | A61B 17/07207 |
| 2019/0275678 | A1* | 9/2019 | Takeuchi | B25J 9/1633 |

OTHER PUBLICATIONS

N. Hogan, "Stable execution of contact tasks using impedance control," 1987, IEEE, Proceedings International Conference on Robotics and Automation, 1987, pp. 1047-1054, doi:10.1109/ROBOT.1987.1087854. (Year: 1987).*

N. Hogan, Impedance Control: An Approach to Manipulation: Part I—Theory, 1985, ACADEMIA, Journal of Dynamic Systems, Measurement, and Control, Mar. 1985, vol. 107, pp. 1-8 (Year: 1985).*

N. Hogan, Impedance Control: An Approach to Manipulation: Part II—Implementation, 1985, ACADEMIA, Journal of Dynamic Systems, Measurement, and Control, Mar. 1985, vol. 107, pp. 8-16 (Year: 1985).*

N. Hogan, Impedance Control: An Approach to Manipulation: Part III—Applications, 1985, ACADEMIA, Journal of Dynamic Systems, Measurement, and Control, Mar. 1985, vol. 107, pp. 17-24 (Year: 1985).*

* cited by examiner

CONTROL DEVICE, ROBOT SYSTEM, AND ROBOT

The present application is based on, and claims priority from, JP Application Serial Number 2018-154380, filed Aug. 21, 2018, the disclosure of which is hereby incorporated by reference herein in its entirety.

BACKGROUND

1. Technical Field

The present disclosure relates to a control device of a robot, a robot system, and the robot.

2. Related Art

As a robot, a robot that performs force control using a force detection unit is known. There are various types of work that use force control. JP-A-2018-62050 discloses a technique of performing screw fastening using force control. JP-A-2012-76805 discloses a technique of transporting an article using force control with a two-arm robot. During the execution of the work of the robot, the work of the robot may be stopped for some reasons such as opening of a safety door.

However, the inventors of the present application have found that when the work is stopped while executing the force control, it may be difficult to restart the work, or a defect such as breakage of the article handled by a robot may occur depending on the stopping method.

SUMMARY

According to an aspect of the present disclosure, there is provided a control device that controls a robot provided with a movable unit and a force detection unit which detects force applied to the movable unit from an object in contact with the movable unit. The control device includes a control portion which executes a force control to the movable unit according to an output of the force detection unit, and the control unit executes stop control of the movable unit when a predetermined stop condition is satisfied. The stop control includes a second control which continues the force control to control the movable unit when the stop condition is satisfied during the execution of a first control including the force control.

DESCRIPTION OF EXEMPLARY EMBODIMENTS

A. First Embodiment

Figure 1:
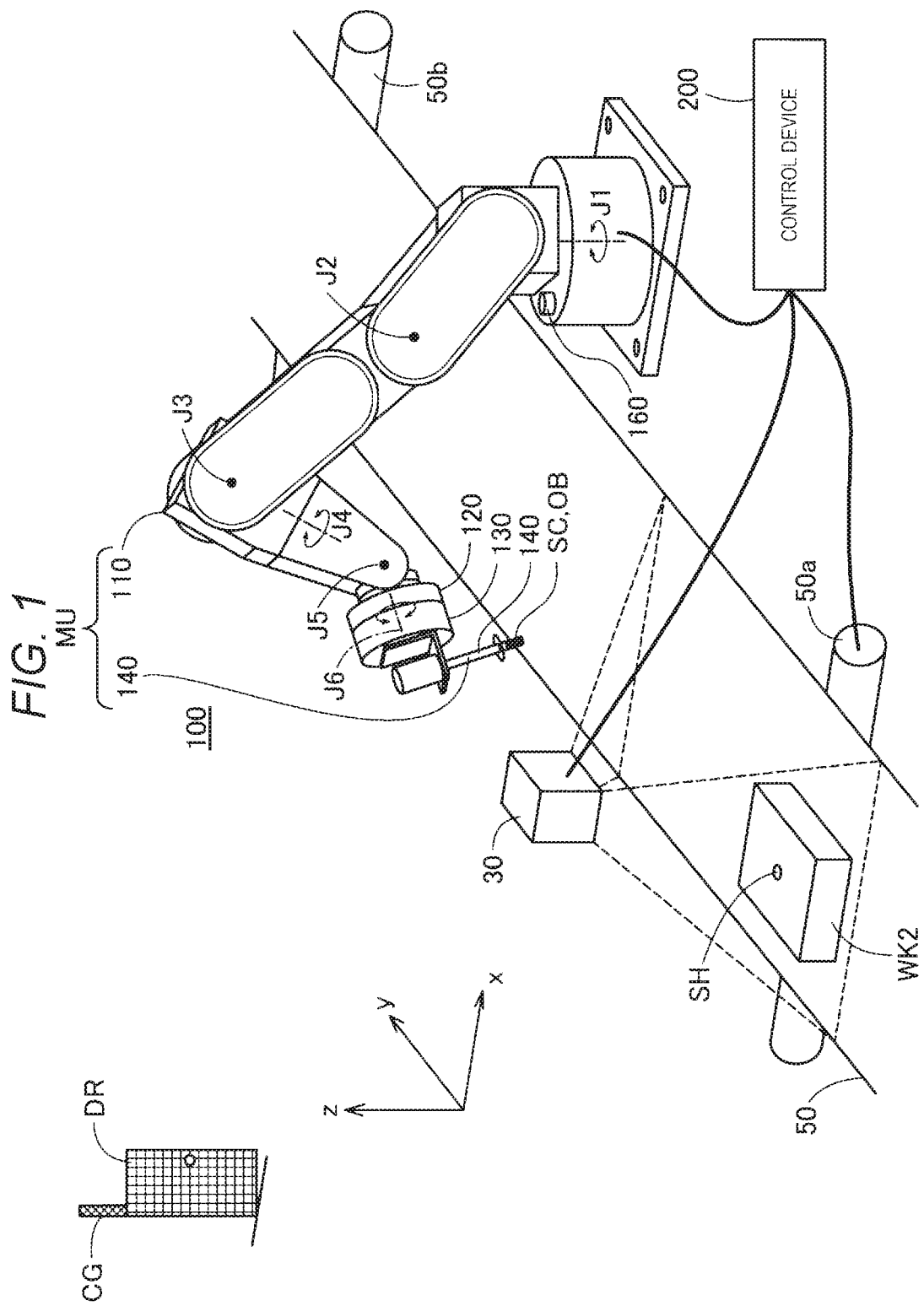
FIG. 1 is an explanatory diagram of a robot system configured to execute a force/position simultaneous control process.

FIG. 1 is an explanatory diagram showing a configuration example of a robot system. The robot system includes a camera 30, a transport device 50, a robot 100, and a control device 200. The robot 100 and the control device 200 are communicably connected via a cable or radio. The periphery of a work area of the robot 100 is surrounded by a safety fence CG. The safety fence CG is provided with a safety door DR accessible to people. A signal indicating the open/close state of the safety door DR is supplied to the control device 200.

The robot 100 is a single arm robot that is used by attaching various end effectors on an arm flange 120 at a tip end of an arm 110. The arm 110 has six joints J1 to J6. The joints J2, J3, and J5 are bending joints and the joints J1, J4, and J6 are twisting joints. Various end effectors for performing work such as gripping and processing on a workpiece are installed on the arm flange 120 at the tip end of the joint J6. A point in the vicinity of the tip end of the arm 110 can be set as a tool center point (TCP). The TCP is a position used as a reference of the positions of the end effectors and can be set at any position. In the present embodiment, a six-axis robot is used, but a robot having another joint mechanism may be used.

The robot 100 can set the end effectors at any positions in any orientations within a movable range of the arm 110. A force detection unit 130 and a screw driver 140 as an end effector are installed at the arm flange 120. As the end effector, any kind of end effector other than the screw driver 140 can be used. The force detection unit 130 is a six-axis sensor that measures three-axis force acting on the end effector and torque acting around the three axes. The force detection unit 130 measures magnitude of force parallel to three measurement axes orthogonal to each other in a sensor coordinate system which is a unique coordinate system, and the magnitude of torque around the three measurement axes. A force sensor as a force detection unit may be provided at any one or more joints J1 to J5 other than the joint J6. The force detection unit may only measure the force and torque in a direction of control, and a unit for directly measuring the force and torque like the force detection unit 130 or a unit for measuring the torque of the joint of the robot to obtain the force and the torque indirectly may be used. The force detector may measure the force and torque only in the direction of controlling force.

In the robot system of FIG. 1, a mechanism in which the arm 110 and the screw driver 140 as an end effector are combined is called a "movable unit MU". An article which comes into contact with the movable unit MU is called an "object OB", and a portion of the movable unit MU which comes into contact with the object OB is called a "contact portion". In the example of FIG. 1, a screw SC is the "object OB", and a tip end of the screw driver 140 is the "contact portion". The force detection unit 130 detects the force applied to the movable unit MU from the object OB in contact with the movable unit MU.

On a base of the robot 100, an object detection unit 160 which detects an object approaching the robot 100 is installed. As the object detection unit 160, for example, a proximity sensor such as a millimeter wave radar or a light curtain can be used. When the object approaches within a predetermined distance threshold value, the object detection unit 160 supplies an output signal indicating the approach of the object to the control device 200. A representative example of an object is a person. Any number of object detection units 160 may be installed at any position of the robot 100. For example, a plurality of the object detection units 160 may be provided so as to detect the approach of an object over the entire range of 360 degrees around the robot 100.

A coordinate system that defines a space in which the robot 100 is installed is called a robot coordinate system. A robot coordinate system is a rectangular coordinate system in three dimensions defined by an x axis and a y axis orthogonal to each other on a horizontal plane and a z axis with an upward vertical direction as a positive direction. Any position in the three-dimensional space can be represented by the position in the x, y, and z axis directions, and any orientation in the three-dimensional space can be represented by the rotation angles around each axis. The position represented by three dimensional coordinate values is referred to as a position in a narrow sense, and the force that can be resolved into force components parallel to the three axial directions is referred to as force in a narrow sense. When simply written as a "position", it means both position and orientation in a narrow sense. When simply expressed as "force", it means both force and torque in a narrow sense.

In the present embodiment, a workpiece WK is transported by the transport device 50. The transport device 50 includes transport rollers 50a and 50b. The transport device 50 can transport the workpiece WK placed on a transport surface by moving the transport surface by rotating these transport rollers 50a and 50b. The camera 30 is installed above the transport device 50. The camera 30 is installed such that the workpiece WK on the transport surface is in the visual field. A screw hole SH is formed on an upper surface of the workpiece WK. The screw driver 140 can perform the work of screwing the screw SC into the screw hole SH of the workpiece WK. The screw fastening work may be performed in a state in which the transport surface is stopped, or, may be executed while moving the transport surface. The transport device 50 and the camera 30 can be omitted.

The control device 200 controls the arm 110, the screw driver 140, the transport device 50, and the camera 30. The functions of the control device 200 are realized, for example, by a computer with a processor and a memory executing a computer program. The control device 200 can also be realized using a plurality of processors.

Figure 2A:
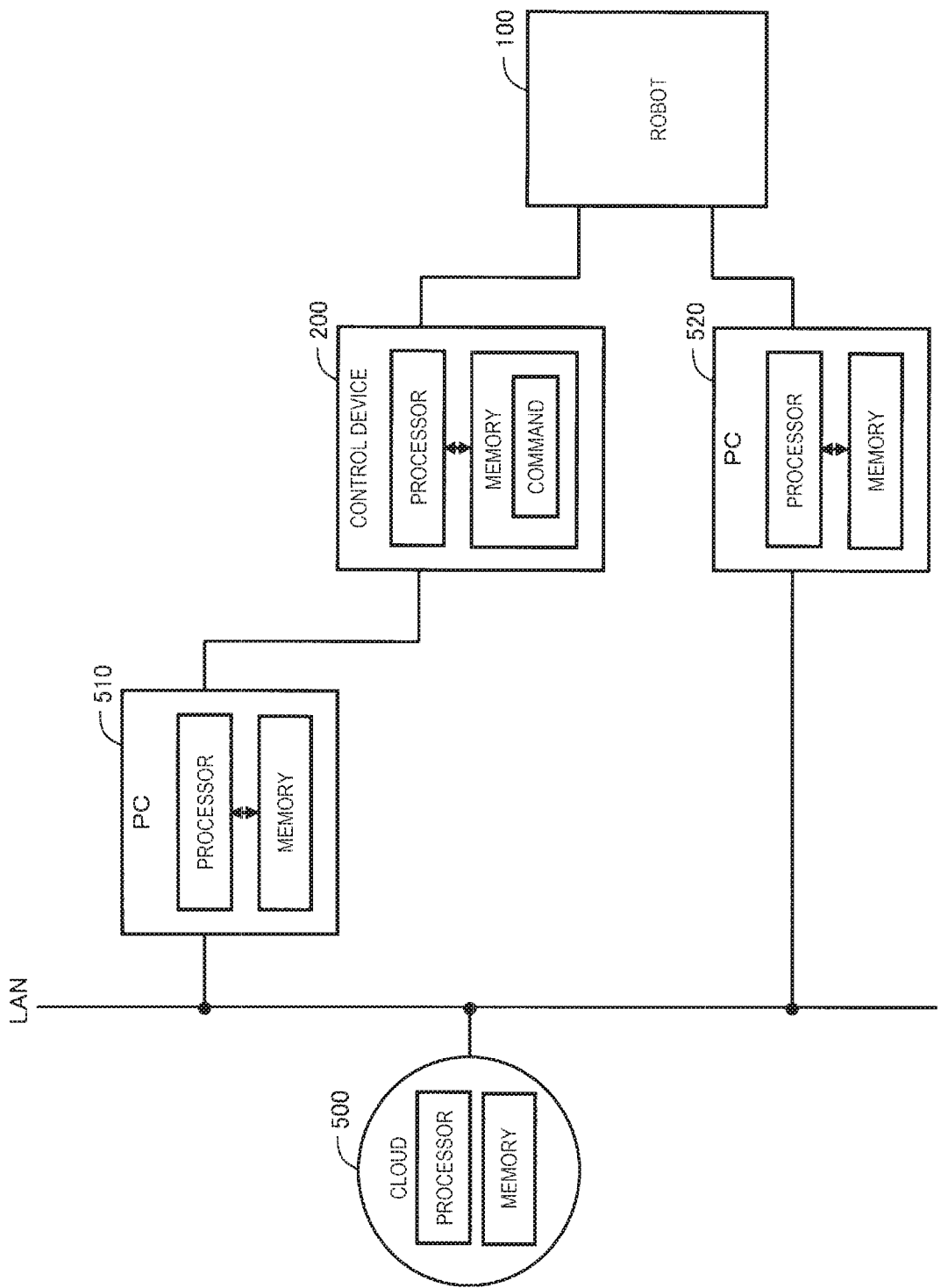
FIG. 2A is a conceptual diagram showing an example of a control device having a plurality of processors.

FIG. 2A is a conceptual diagram showing an example in which the control device of the robot is constituted by the plurality of processors. In the example, personal computers 510 and 520 and a cloud service 500 provided via a network environment such as LAN are illustrated in addition to the robot 100 and the control device 200 thereof. Each of the personal computers 510 and 520 includes a processor and a memory. A processor and a memory can be used in the cloud service 500. The control device of the robot 100 can be realized by using some or all of a plurality of these processors.

Figure 2B:
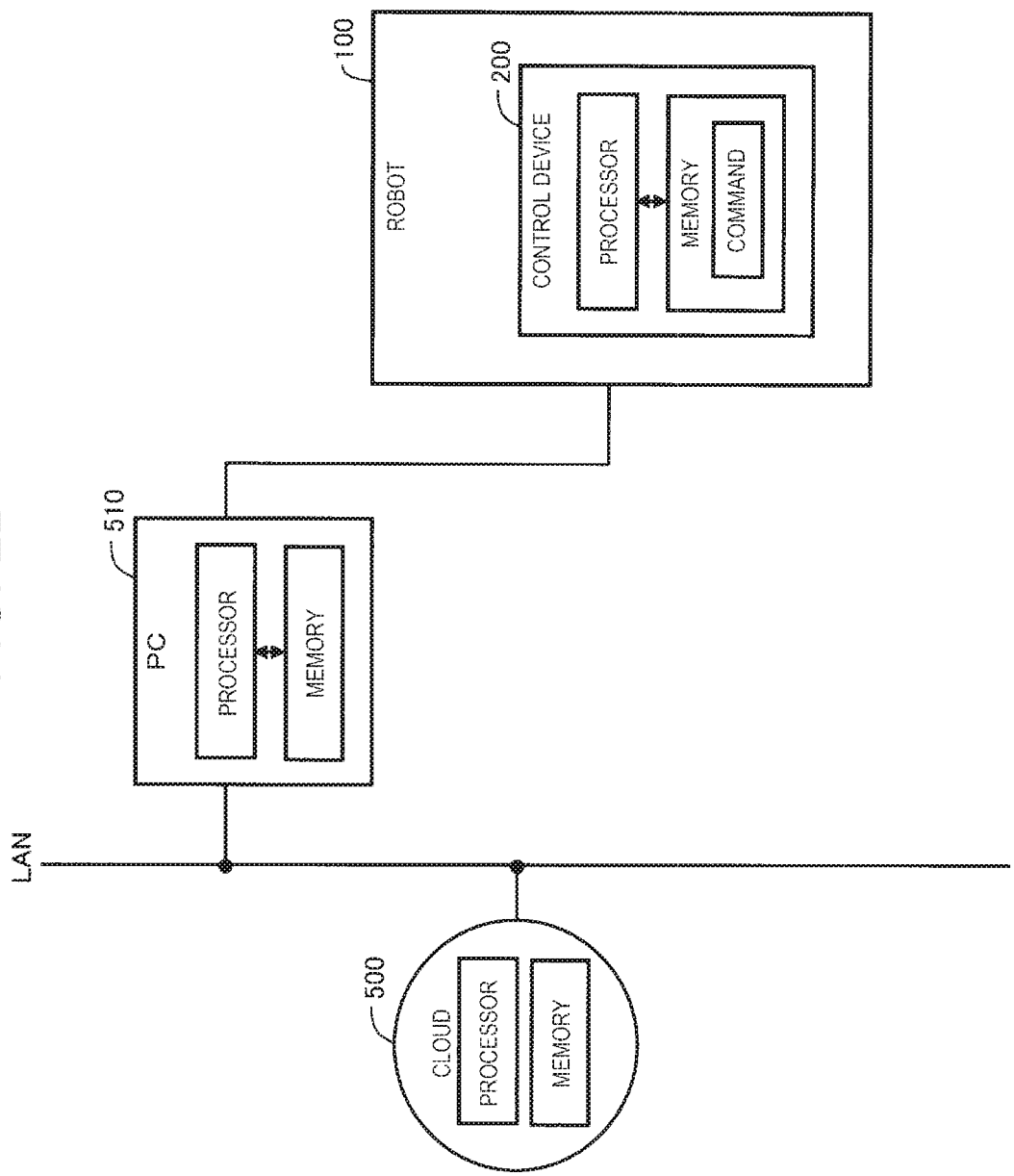
FIG. 2B is a conceptual diagram showing another example of the control device having the plurality of processors.

FIG. 2B is a conceptual diagram showing another example of a control device of a robot constituted by a plurality of processors. This example is different from FIG. 2A in that the control device 200 of the robot 100 is stored in the robot 100. The control device of the robot 100 can also be realized by using some or all of a plurality of these processors in this example.

Figure 3:
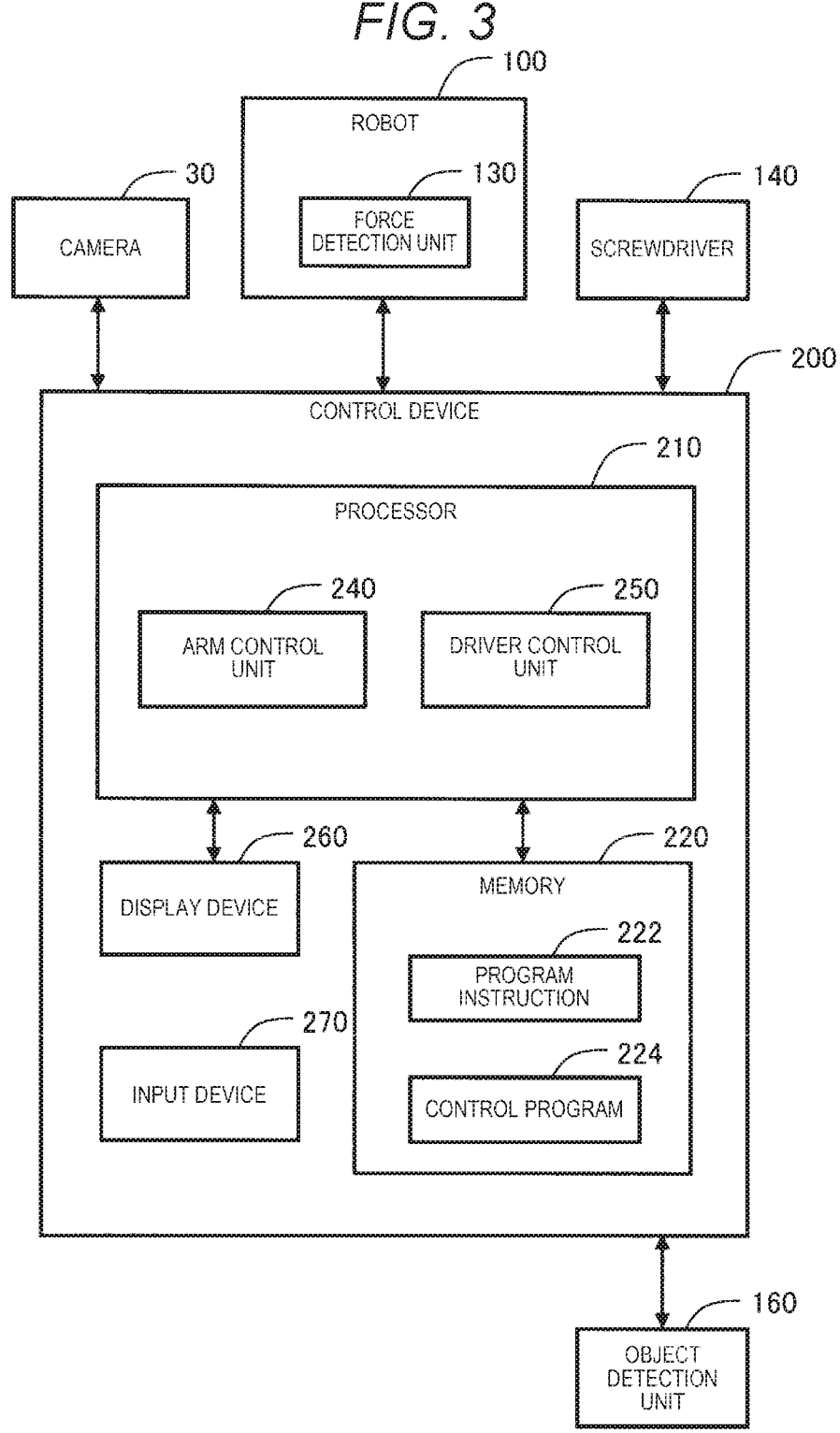
FIG. 3 is a functional block diagram of the robot and the control device.

FIG. 3 is a functional block diagram showing functions of the control device 200. The control device 200 includes a processor 210, a memory 220, a display device 260, and an input device 270. The memory 220 includes a main memory and a non-volatile memory. The processor 210 realizes functions of an arm control unit 240 which controls the arm 110 and a driver control unit 250 which controls the screw driver 140 by executing a program instruction 222 stored in the memory 220 in advance. The driver control unit 250 is a unit to realize a function of controlling the screw driver 140 as an end effector, and the function thereof is appropriately changed according to the type of the end effector. That is, the processor 210 is configured to realize the function of an end effector control unit. A control program 224 in which a work sequence of the robot 100 is written is created in advance and stored in the memory 220. The processor 210 causes the robot 100 to execute various works by executing the control program 224. The input device 270 is an input device such as a keyboard or a mouse, and the input and setting by a teacher and a worker are performed using the input device 270. Some or all of the functions of the arm control unit 240 and the driver control unit 250 may be realized by a hardware circuit.

Figure 4:
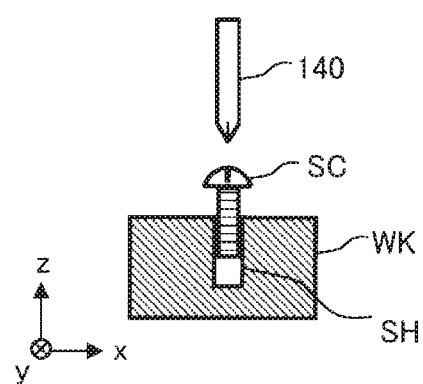
FIG. 4 is an explanatory diagram showing a screw fastening process as the force/position simultaneous control process.

FIG. 4 is an explanatory diagram showing screw fastening work performed using the robot 100. The screw fastening work is a work of screwing the screw SC into the screw hole SH formed in the workpiece WK using the screw driver 140. When fastening a screw, a force control to press the screw driver 140 with a target force in the −z direction in a state where the screw driver 140 is rotated and a position control to move the screw driver 140 to a target position in the −z direction are simultaneously executed. As described above, a work process in which the force control and the position control are simultaneously executed is called a "force/position simultaneous control process". As described below, the force/position simultaneous control process includes various kinds of work processes other than screw fastening.

Figure 5:
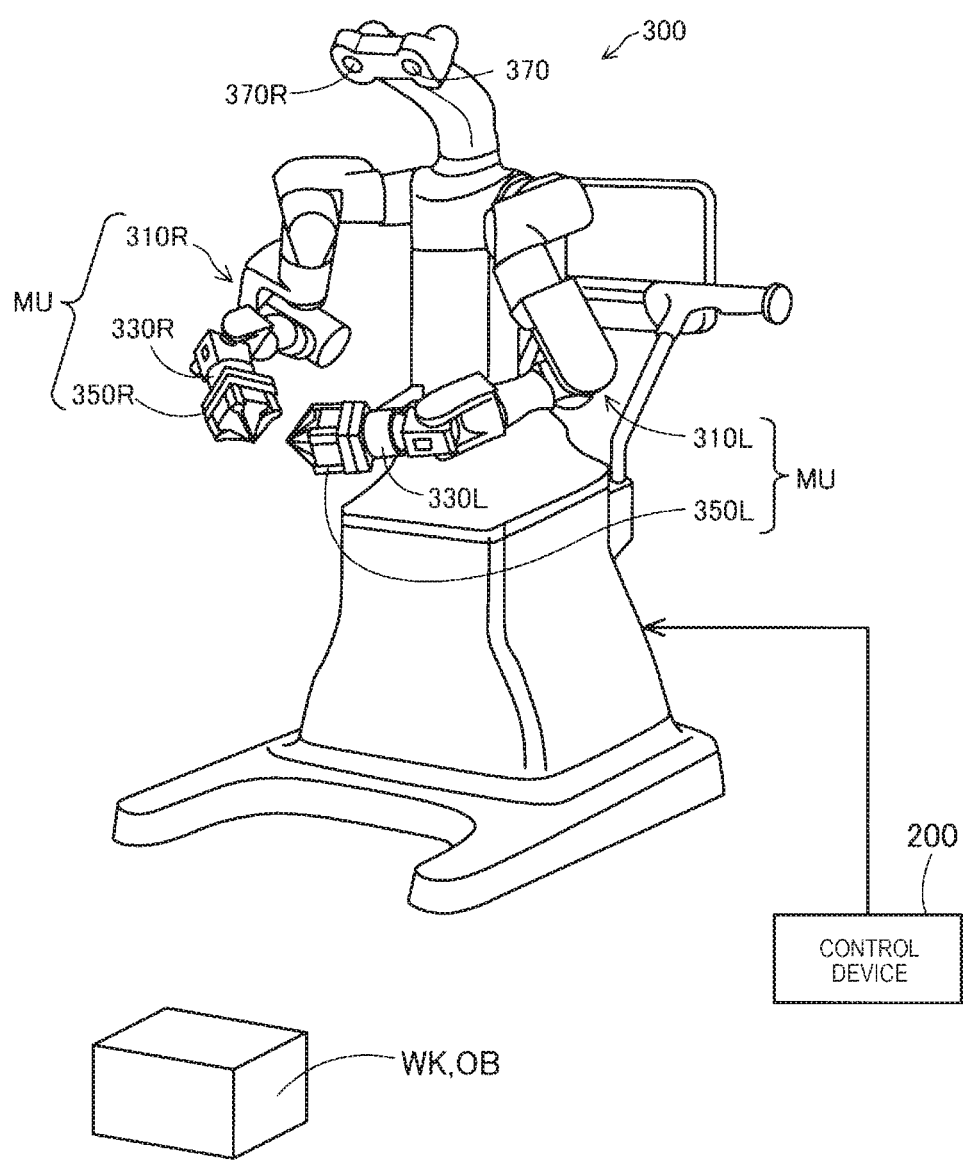
FIG. 5 is an explanatory diagram of another configuration of the robot system configured to execute the force/position simultaneous control process.

FIG. 5 is an explanatory diagram showing a configuration example of another robot system configured to execute the force/position simultaneous control process. The robot system includes a robot 300 and a control device 200 connected to the robot 300. The robot 300 is a two-arm robot having two arms 310L and 310R. Force detection units 330L and 330R and hands 350L and 350R as end effectors are installed at the arms 310L and 310R. The hands 350L and 350R are a gripping mechanism configured to grip a workpiece or a tool. Two cameras 370L and 370R are provided at the head of the robot 300. In FIG. 5, the safety door DR and the object detection unit 160 described in FIG. 1 are not shown.

The robot 300 can execute transport work of transporting a box as the workpiece WK while holding the box between two hands 350L and 350R. The transport work is a force/position simultaneous control process in which the force control to press the two hands 350L and 350R in a direction facing each other with the target force and the position control to move the workpiece WK held between the two hands 350L and 350R to the target position are simultaneously executed. In the robot system, the mechanism in which the arms 310L and 310R and the hands 350L and 350R as end effectors are combined corresponds to the "movable unit MU". The tip ends of the hands 350L and 350R correspond to the "contact portion", and the workpiece WK corresponds to the "object OB".

As shown in FIGS. 1 and 5, various work processes can be executed as a force/position simultaneous control process. In the following description of the first embodiment, a case of performing the screw fastening work as a force/position simultaneous control using the robot 100 mainly shown in FIG. 1 will be described. However, the following description is equally applicable to a force/position simultaneous control process using the robot 300 of FIG. 5 or another robot.

Figure 6:
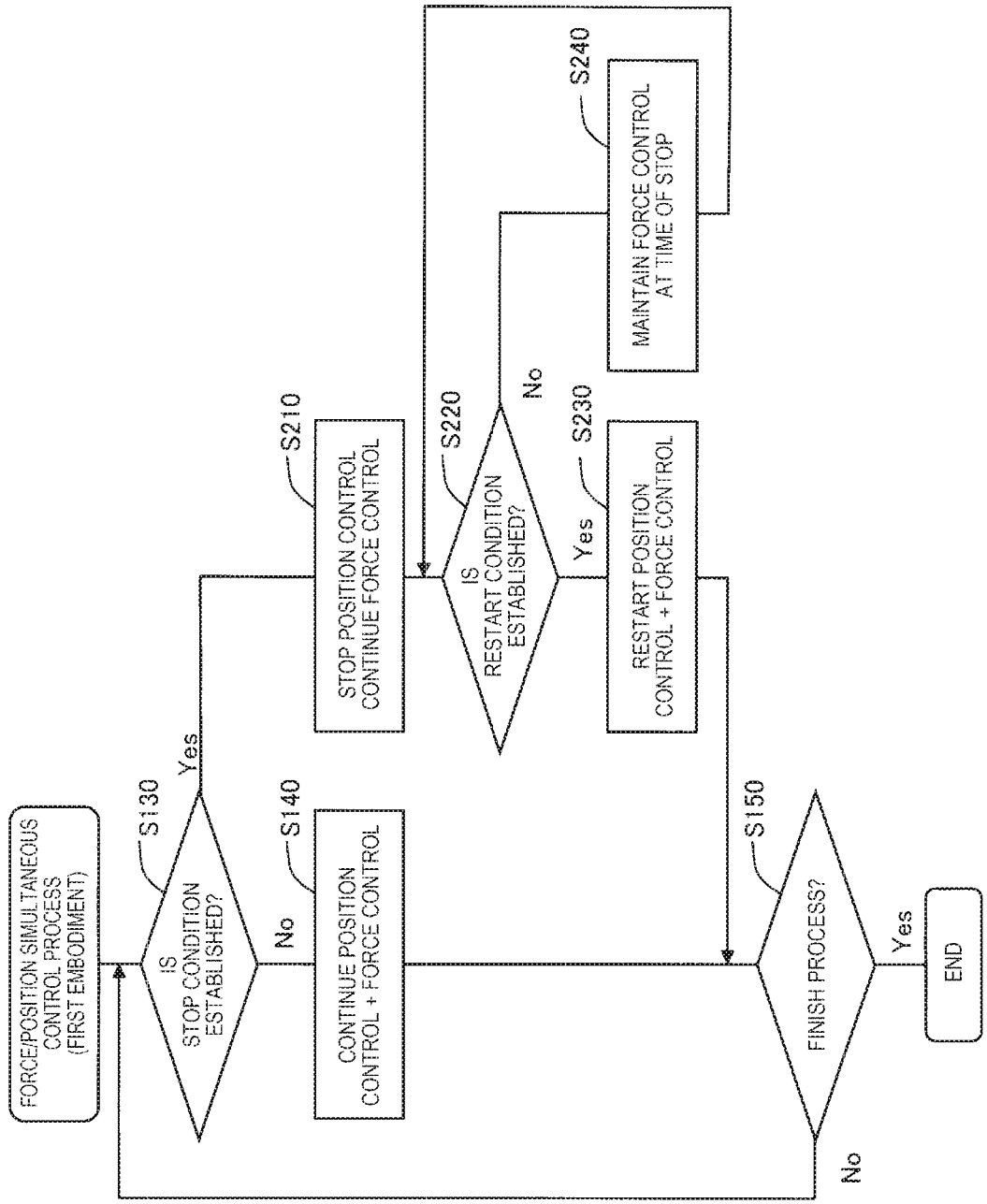
FIG. 6 is a flowchart showing an execution procedure of a force/position simultaneous control process in a first embodiment.

FIG. 6 is a flowchart showing an execution procedure of a force/position simultaneous control process in the first embodiment. This process is controlled by the processor 210 as a control unit. After the process is started, in step S130, it is determined whether or not the predetermined stop condition is satisfied. The stop condition can be determined, for example, when at least one of the following conditions 1 to 5 is satisfied.
Condition 1: the safety door DR is opened.
Condition 2: an emergency stop button (not shown) is pressed by the worker.
Condition 3: the worker issued a stop instruction to the control device 200.
Condition 4: the object detection unit 160 detected an object such as a person at a distance equal to or less than a predetermined distance threshold value.
Condition 5: the worker contacted the robot 100.

The detection of the contact in the above-described condition 5 can be performed, for example, based on whether or not the force detection unit 130 detects an unexpected force. Alternatively, a contact sensor (not shown) may be provided on a surface of the robot 100 to detect the contact. As a stop condition, conditions other than the above-described conditions 1 to 5 may be used. The stop condition may be satisfied when a plurality of conditions such as the conditions 1 to 5 are satisfied.

The process proceeds to step S140 when the stop condition is not satisfied and proceeds to step S150 while continuing the position control and the force control. In step S150, it is determined whether or not the process is ended, and if it is not ended, the process returns to step S130.

On the other hand, the process proceeds to step S210 when the stop condition is satisfied, the position control is stopped, and the force control is continued. Here, the control immediately before the stop of the position control is called a "first control", and the control in step S210 is called a "second control" or a "stop control". In the screw fastening process described in FIGS. 1 and 4, in the second control executed in step S210, the position control to move the screw driver 140 in the −z direction is stopped, and the force control to press the screw driver 140 in the −z direction is continued as it is. The target force at this time is preferably maintained at, for example, a value when the stop condition is satisfied. However, the target force in the second control may be set to a value slightly different from the target force in the first control. Also, in this case, it is preferable to set the target force in the second control to a vale within 100±10% when the target force in the first control is 100%, and more preferable to set the target force to a value within 100±5%. The rotation of the screw driver 140 is also stopped in the second control. As a result, the operation of the movable unit MU configured of the arm 110 and the screw driver 140 is stopped, and the tip end of the screw driver 140 is maintained fitted in the recess formed in the head of the screw SC.

Assuming that the force control is also stopped in step S210, the screw driver 140 is not pressed against the screw SC, so that the tip end of the screw driver 140 may be separated from the recess of the head of the screw SC. In such a case, it becomes extremely difficult to fit the tip end of the screw driver 140 in the recess of the head of the screw SC when restarting work thereafter. On the other hand, in the first embodiment, since the position control is stopped and the position control is continued in the stop control of step S210, it is possible to reduce the possibility of occurrence of a defect that the tip end of the screw driver 140 separates from the recess of the head of the screw SC.

In the transport work of the workpiece WK described in FIG. 5, similarly, assuming that the force control is stopped in step S210, the two hands 350L and 350R cannot hold the workpiece WK, which may cause a drop of the workpiece WK. On the other hand, in the first embodiment, since the position control is stopped and the force control is continued in the stop control of step S210, it is possible to reduce the possibility of the occurrence of a defect that the workpiece WK falls from between the two hands 350L and 350R.

As a force control used in various embodiments, it is preferable to perform impedance control according to the following Equation (1).

$$m\Delta\ddot{S}(t)+d\Delta\dot{S}(t)+k\Delta S(t)=\Delta f_s(t) \quad (1)$$

The left side of Equation (1) is formed of a first term obtained by multiplying a second-order differential value of the position S of the TCP by a virtual inertia coefficient m, a second term obtained by multiplying a differential value of the position S of the TCP by a virtual viscosity coefficient d, and a third term obtained by multiplying the position S of the TCP by a virtual elastic coefficient k. The variable t is time. The right side of Equation (1) is a force deviation $\Delta f_s(t)$ obtained by subtracting the actual acting force from the target force. The TCP is set, for example, at the tip end of the screw driver 140.

In the force control executed by the stop control of step S210 of FIG. 6, the virtual inertia coefficient m and the virtual viscosity coefficient d may be larger than the values used at the time before stopping the position control. In other words, the virtual inertia coefficient m of the second control of step S210 may be larger than the virtual inertia coefficient m of the first control before stopping the position control, and the virtual viscosity coefficient d of the second control may be larger than the virtual viscosity coefficient d of the first control before stopping the position control. In this way, it is possible to lower the responsiveness of the change in the position of the movable unit MU to the fluctuation of the force between the movable unit MU and the object OB. In the example shown in FIG. 1, since the position of the screw driver 140 hardly changes even when the force temporarily changes, it is possible to reduce the possibility of occurrence of a defect that the tip end of the screw driver 140 separates from the recess of the head of the screw SC. Similarly, in the example shown in FIG. 5, since the positions of the hands 350L and 350R hardly change even when the force temporarily changes, it is possible to reduce the possibility of occurrence of a defect that the workpiece WK falls.

In step S220, it is determined whether or not a predetermined restart condition is satisfied. The restart condition is, for example, that the stop condition satisfied in step S130 is resolved. If the restart condition is not satisfied, the process proceeds to step S240, the force control at the time of the stop is maintained, and the process returns to step S220. On the other hand, if the restart condition is satisfied, the process proceeds to step S230, and the force/position simultaneous control is restarted. After the restart, the process proceeds to step S150, and it is determined whether or not the process is ended.

As described above, the stop control of the movable unit MU is executed when the predetermined stop condition is satisfied during the execution of the first control including the force control in the first embodiment. This stop control is a control including the second control for controlling the movable unit MU by continuing the force control when the stop condition is satisfied after stopping the movable unit MU. In this way, after the movable unit MU is stopped as the stop condition is satisfied during the execution of the first control including the force control, the second control for controlling the movable unit MU by continuing the force control when the stop condition is satisfied is executed, so that it is possible to reduce the possibility of occurrence of a defect when stopping the work during the execution of the force control.

B. Second Embodiment

Figure 7:
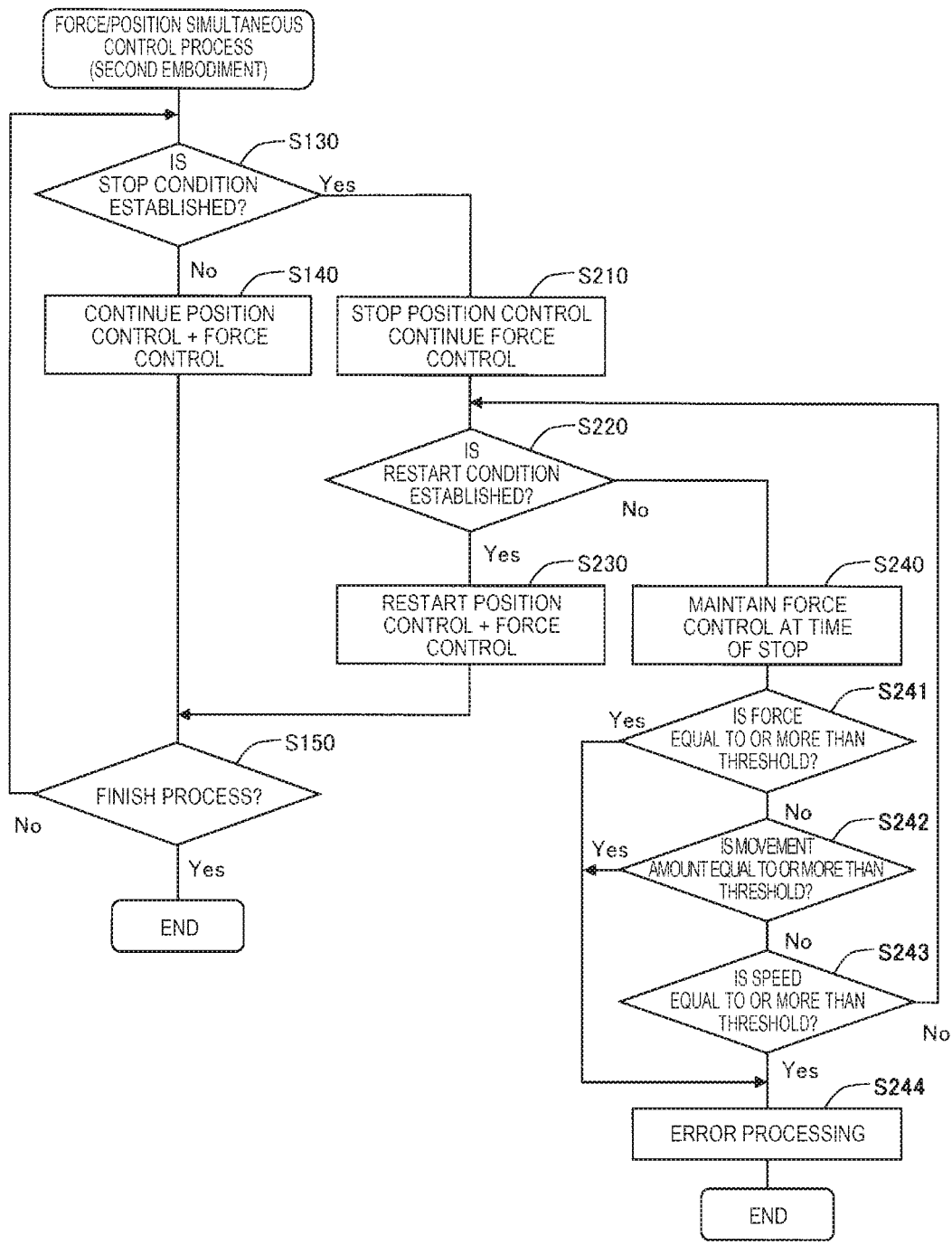
FIG. 7 is a flowchart showing an execution procedure of a force/position simultaneous control process in a second embodiment.

FIG. 7 is a flowchart showing an execution procedure of a force/position simultaneous control process in a second embodiment. The second embodiment is different from the first embodiment only in the part of the execution procedure of force/position simultaneous control process, and the device configuration is the same as that of the first embodiment. FIG. 7 is different from FIG. 6 only in that steps S241 to S244 are added after step S240, and the others are the same as FIG. 6.

In steps S241 to S243, the processor 210 monitors the force applied to the movable unit MU, the moving amount of the movable unit MU, and the speed of the movable unit MU, and when at least one of the values is equal to or larger than a predetermined value, the process proceeds to step S244 to execute error processing. The moving amount of the movable unit MU is a value based on the time when the position control is stopped in step S210. As error processing, for example, processing for completely stopping the robot 100 by stopping the force control, processing for notifying a worker with an alarm, and the like can be set in advance.

In the example of FIG. 7, the operation is limited for three values of force, moving amount, and speed. However, the limitation may be performed using only one of these values, or, may be performed using any combination. As coordinate systems used in this limitation, any coordinate systems such as a robot coordinate system, a tool coordinate system based on TCP, a work coordinate system based on the workpiece, and other local coordinate systems can be used. In the coordinate system, a threshold value or an allowable range may be set to different values or ranges for each coordinate axis. Further, the limitation may be performed only on a part of coordinate axes of the coordinate system. The threshold value and the allowable value of the moving amount may be designated by a relative distance based on the stop position or may be designated by a coordinate value of an absolute coordinate system such as a robot coordinate system. The operation may be limited when a condition determined by one or more of the force, the moving amount, and the speed is continuously satisfied for a predetermined time. For example, the force momentarily exceeding the force threshold value may be allowed, and the error processing may be performed when the force continuously exceeds the force control for one second.

As described above, in the second embodiment as in the first embodiment, after the movable unit MU is stopped as the stop condition is satisfied during the execution of the first control including the force control, the second control for controlling the movable unit MU by the target control when the stop condition is satisfied is executed, so that it is possible to reduce the possibility of occurrence of a defect when stopping the work during the execution of the force control. In the second embodiment, after the stop control, the preset error processing is executed when at least one of the monitored values of the force applied to the movable unit MU, the moving amount of the movable unit MU, and the speed of the movable unit MU is equal to or larger than the threshold value. Therefore, even when the movable unit MU is in an unexpected state after the stop control started in step S210, it is possible to reduce the possibility of occurrence of any defect caused by it.

C. Third Embodiment

Figure 8:
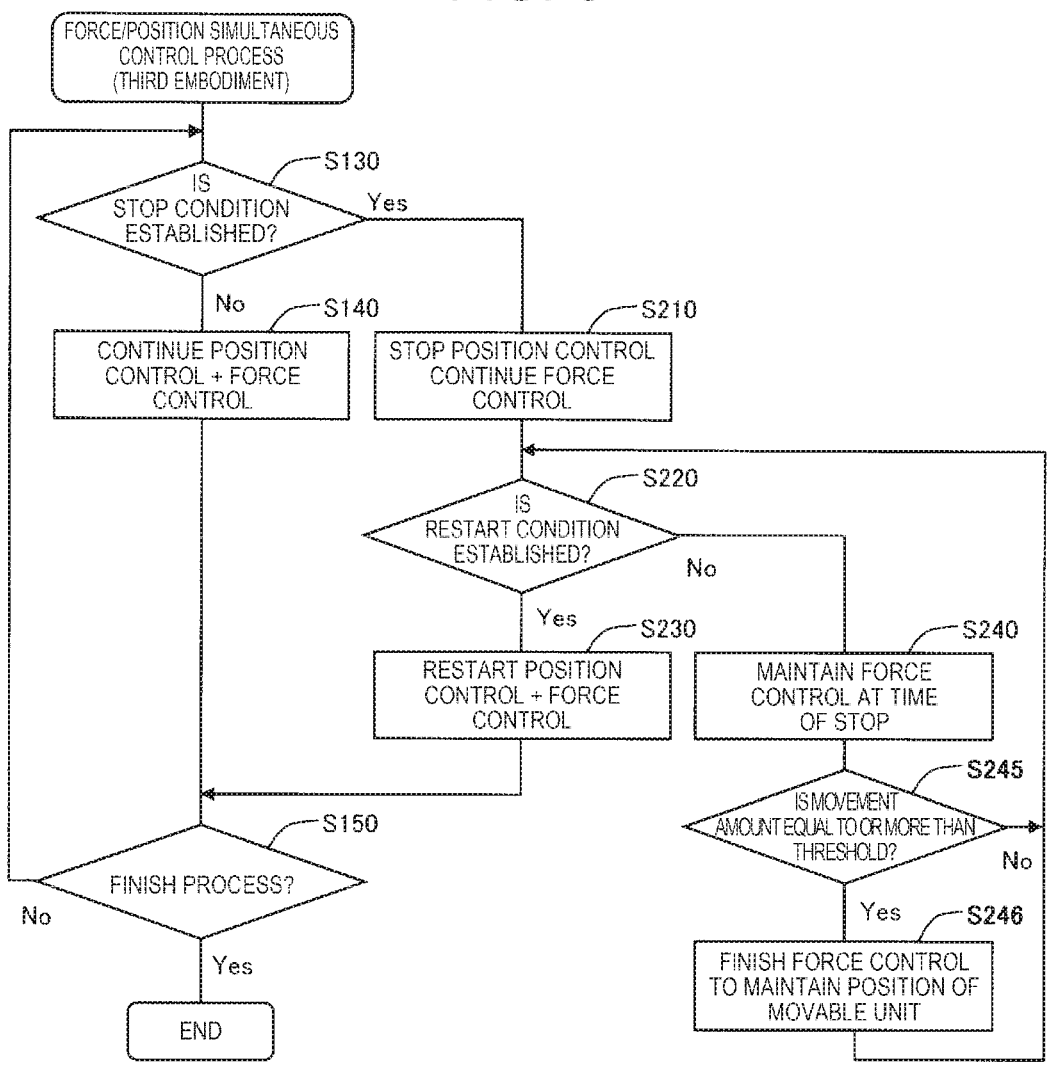
FIG. 8 is a flowchart showing an execution procedure of a force/position simultaneous control process in a third embodiment.

FIG. 8 is a flowchart showing an execution procedure of a force/position simultaneous control process in a third embodiment. The third embodiment is different from the first embodiment only in the part of the execution procedure of force/position simultaneous control process, and the device configuration is the same as that of the first embodiment. FIG. 8 is different from FIG. 6 only in that steps S245 and S246 are added after step S240, and the others are the same as FIG. 6.

In step S245, it is determined whether or not the moving amount of the movable unit MU after stopping the position control in step S210 is equal to or larger than a predetermined threshold value. When the moving amount of the movable unit MU is less than the predetermined threshold value, the process returns to step S220 as it is. On the other hand, when the moving amount of the movable unit MU is equal to or larger than the predetermined threshold value, the process proceeds to step S246 and returns to step S220 after ending the force control and starting the control to maintain the position of the movable unit MU.

The reason for performing steps S245 and S246 of FIG. 8 is as follows. In order to maintain the force in the second control started from step S210, the arm 110 needs to move. However, when the moving amount of the arm 110 becomes excessively large, there may be cases where some other defects occur. For example, in the example of FIG. 4, if the moving amount of the screw driver 140 in the −z direction becomes excessively large, the screw SC may enter into the workpiece WK to an unexpected depth. Therefore, in the third embodiment, in the second control started from step S210, when the moving amount of the contact portion of the movable unit MU is equal to or larger than the predetermined threshold value, the second control is ended and moves on to the control for maintaining the position of the movable unit MU. As a result, it is possible to reduce the possibility of the occurrence of a defect due to the moving amount of the movable unit MU or the contact portion thereof.

As described above, in the third embodiment as in the first embodiment, after the movable unit MU is stopped as the stop condition is satisfied during the execution of the first control including the force control, the second control for controlling the movable unit MU by continuing the force control when the stop condition is satisfied is executed, so that it is possible to reduce the possibility of occurrence of a defect when stopping the work during the execution of the force control. In the third embodiment, since the second control is ended and the position of the movable unit MU is maintained when the moving amount of the movable unit MU or the contact portion thereof becomes equal to or larger than the threshold value in the second control, it is possible to reduce the possibility of the occurrence of a defect due to the moving amount of the movable unit MU or the contact portion thereof becoming excessively large.

D. Fourth Embodiment

Figure 9:
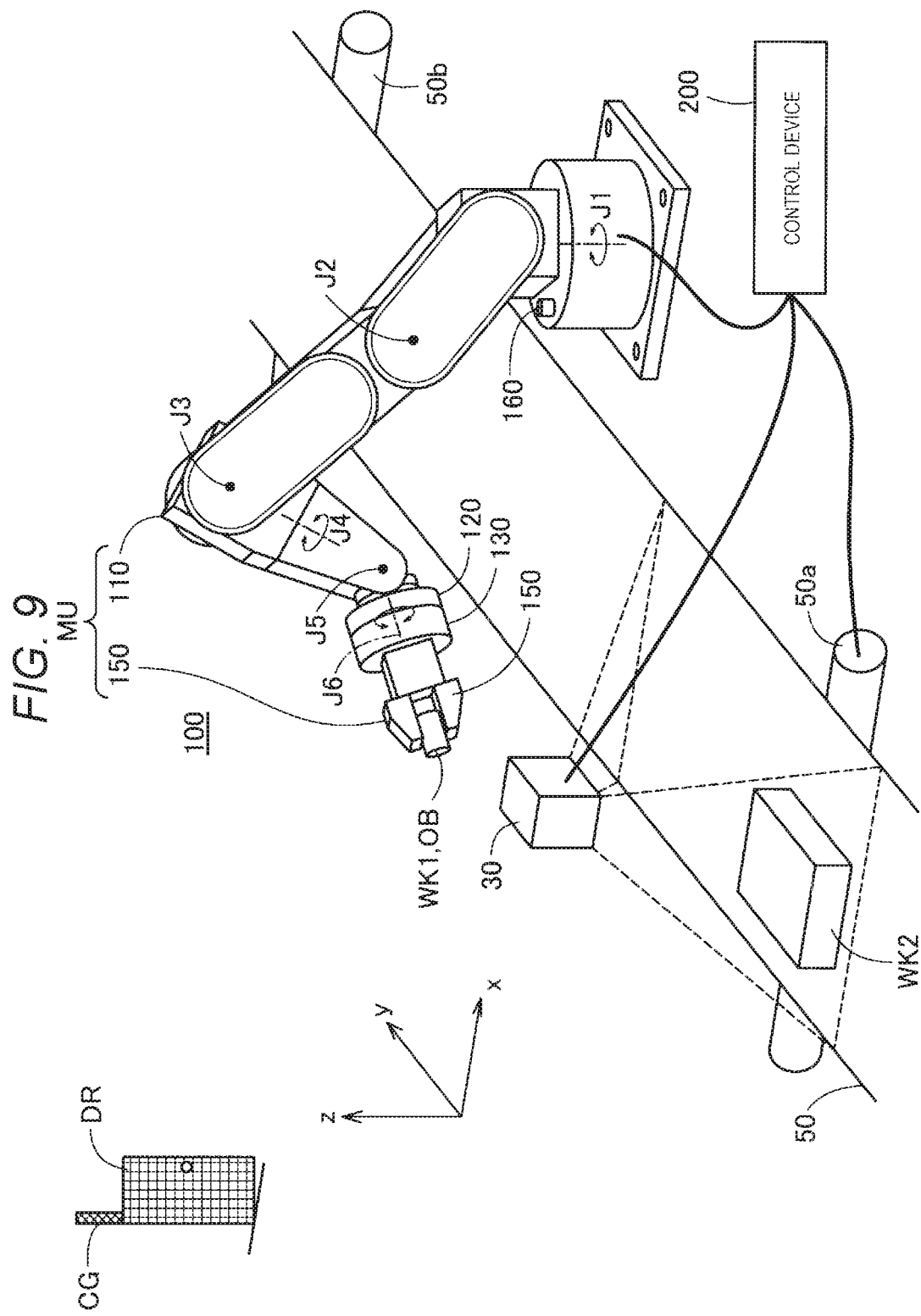
FIG. 9 is an explanatory diagram of a robot system used in a fourth embodiment.

FIG. 9 is an explanatory diagram of a robot system used in a fourth embodiment. The robot system is obtained by changing the end effector of the robot system of FIG. 1 from the screw driver 140 to a gripper 150. The robot system can perform a work of bonding a first workpiece WK1 held by the gripper 150 to a second workpiece WK2. The bonding work is a force control process which is performed according to the force control, but the position control is not simultaneously performed with the force control. In the robot system, a mechanism in which the arm 110 and the gripper 150 are combined corresponds to the "movable unit MU". The grip portion of the gripper 150 corresponds to the "contact portion", and the first workpiece WK1 corresponds to the "object OB".

Figure 10:
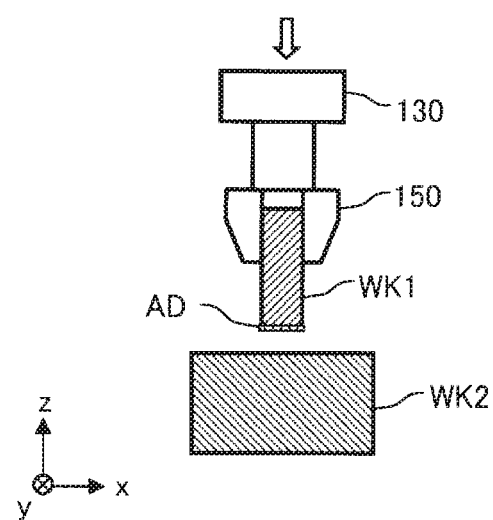
FIG. 10 is an explanatory diagram showing a bonding process as a force control process executed in the fourth embodiment.

FIG. 10 is an explanatory diagram showing a bonding process as a force control process executed in the fourth embodiment. Here, an adhesive AD is applied to a lower surface of the first workpiece WK1, and the first workpiece WK1 is pressed against the surface of the second workpiece WK2 and bonded. At the time of bonding, the force control is executed to press the gripper 150 with the target force in the −z direction, but the position control is not performed at this time. As described above, a work process in which only the force control is executed is called a "force control process".

Figure 11:
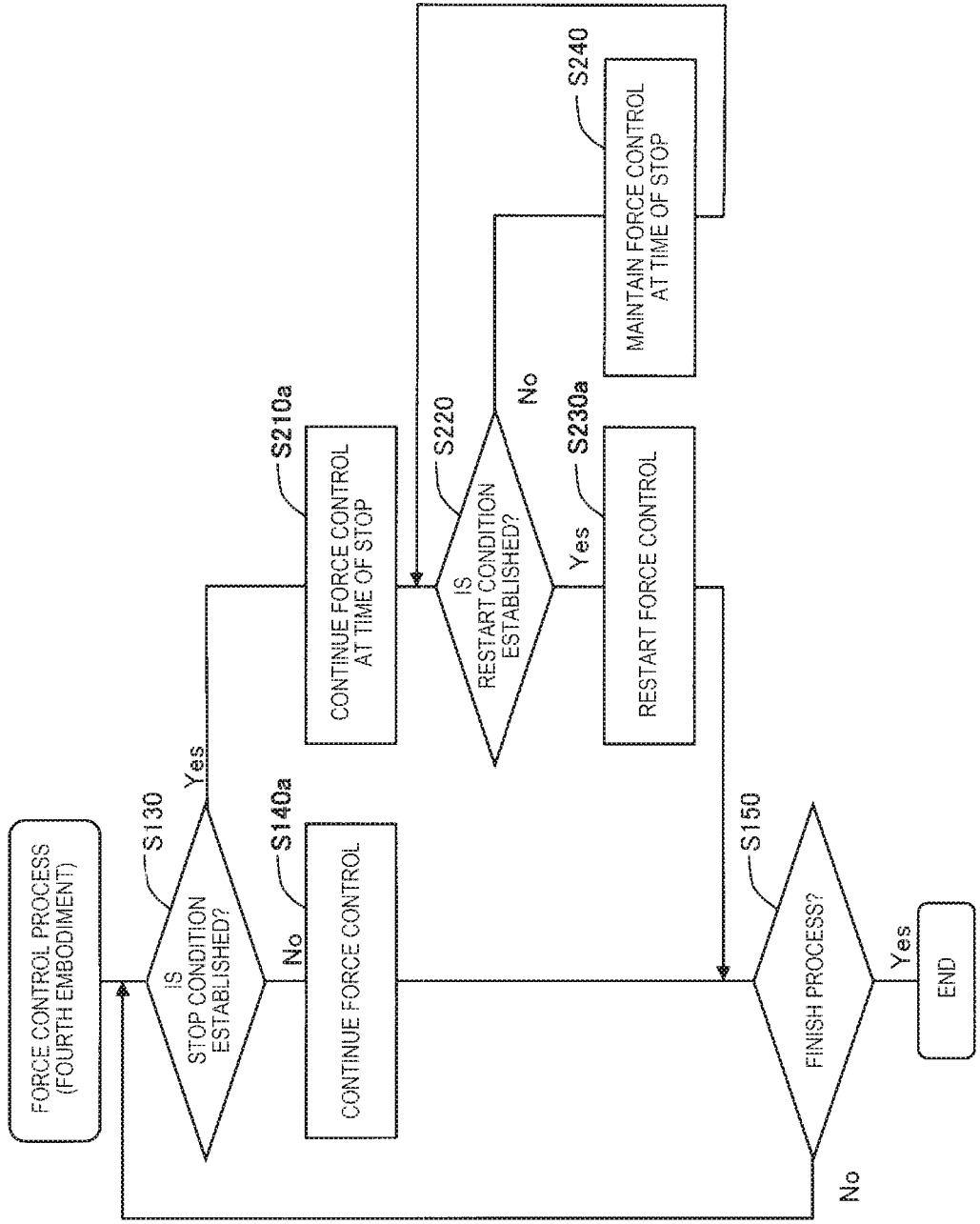
FIG. 11 is a flowchart showing an execution procedure of the force control process in the fourth embodiment.

FIG. 11 is a flowchart showing an execution procedure of the force control process in the fourth embodiment. The procedure of FIG. 11 corresponds to a modification of steps S140, S210, and S230 of FIG. 6.

When it is determined in step S130 that the stop condition is not satisfied, the process proceeds to step S140a, the force control is continued as it is, and the process proceeds to step S150. In step S150, it is determined whether or not the process is ended, and if it is not ended, the process returns to step S130.

On the other hand, when the stop condition is satisfied, the process proceeds to step S210a, the movement of the movable unit MU is stopped and the stop control for continuing the force control is executed. As the stop control, the stop control may be executed according to the various options and settings described in a fifth embodiment described later. However, also in step S210a, as in step S210 of the first embodiment, it is preferable to maintain the force control when the stop condition is satisfied. Moreover, as described in the first embodiment, the virtual inertia coefficient m of the second control of step S210a may be larger than the virtual inertia coefficient m of the first control immediately before stopping the movable unit MU, and the virtual viscosity coefficient d of the second control may be larger than the virtual viscosity coefficient d of the first control immediately before stopping the movable unit MU.

In step S220, it is determined whether or not the predetermined restart condition is satisfied, and if the restart condition is not satisfied, the process proceeds to step S240, the control at the time of stopping is maintained, and returns to step S220. On the other hand, when the restart condition is satisfied, the process proceeds to step S230a, restarts the control, and allows the movement of the movable unit MU. After the restart, the process proceeds to step S150, and it is determined whether or not the process is ended.

As described above, even in the fourth embodiment, as in the first embodiment, the stop control of the movable unit MU is executed when the predetermined stop condition is satisfied during the execution of the first control including the force control. This stop control is a control including the second control for controlling the movable unit MU by continuing the force control when the stop condition is satisfied after stopping the movable unit MU. In this way, after the movable unit MU is stopped as the stop condition is satisfied during the execution of the first control including the force control, the second control for controlling the movable unit MU by continuing the force control when the stop condition is satisfied is executed, so that it is possible to reduce the possibility of occurrence of a defect when stopping the work during the execution of the force control.

With respect to the fourth embodiment, it is possible to apply various the preferred embodiments described in the first embodiment described above and modifications from the first embodiment described in the second embodiment or the third embodiment.

E. Fifth Embodiment

Figure 12:
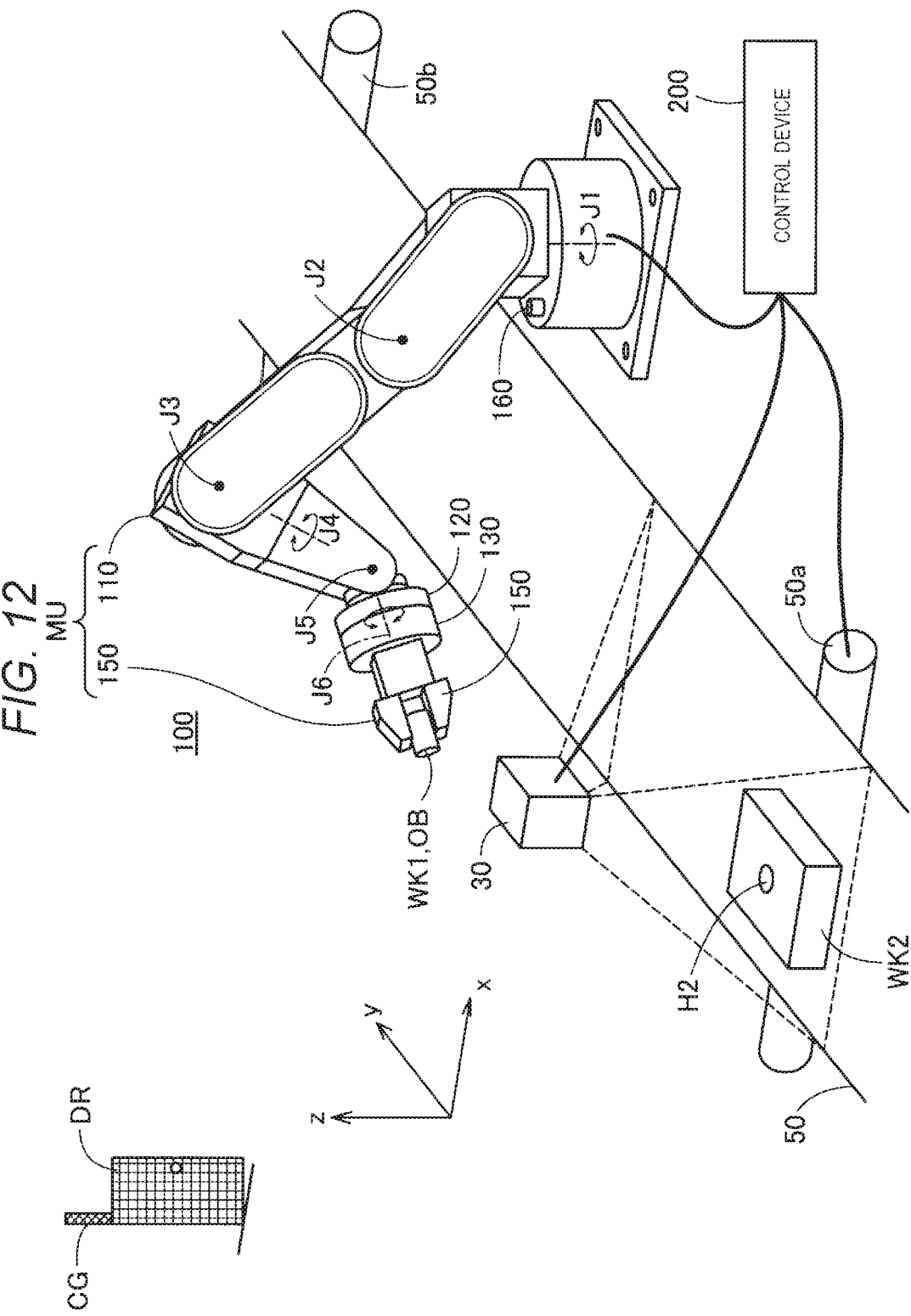
FIG. 12 is an explanatory diagram of a robot system used in a fifth embodiment.

FIG. 12 is an explanatory diagram of a robot system used in the fifth embodiment. The robot system is the same as the robot system shown in FIG. 9, and is different from FIG. 9 in that the second workpiece WK2 has a fitting hole H2. The robot system can perform fitting work of fitting the first workpiece WK1 gripped by the gripper 150 into the fitting hole H2 of the second workpiece WK2. The fitting work is executed according to the work sequence including a plurality of processes using the force control.

Figure 13:
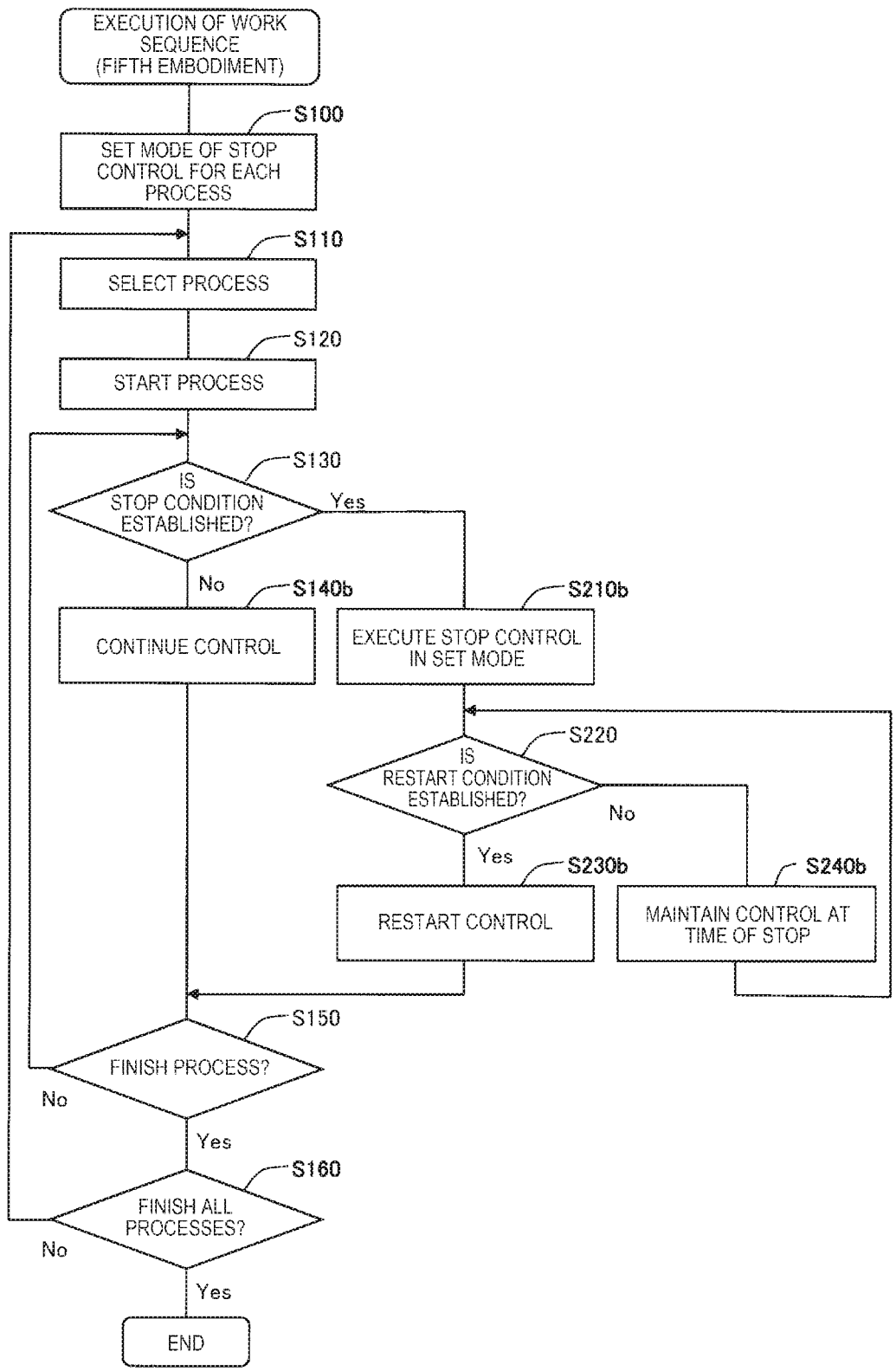
FIG. 13 is a flowchart showing an execution procedure of a work sequence in the fifth embodiment.

FIG. 13 is a flowchart showing an execution procedure of the work sequence in the fifth embodiment. Here, it is assumed that the control device 200 controls the robot 100 according to the control program that describes the work including a plurality of processes. A work including a plurality of processes is called a "work sequence". The procedure of FIG. 13 corresponds to the procedure of FIG. 6 to which steps S100 to S120, and S160 are added, and steps S140, S210, S230, and S240 of FIG. 6 are modified.

In step S100, the worker uses the input device 270 of the control device 200 to set the stop control to be executed in step S210b for each of the plurality of processes included in the work sequence.

Figure 14:
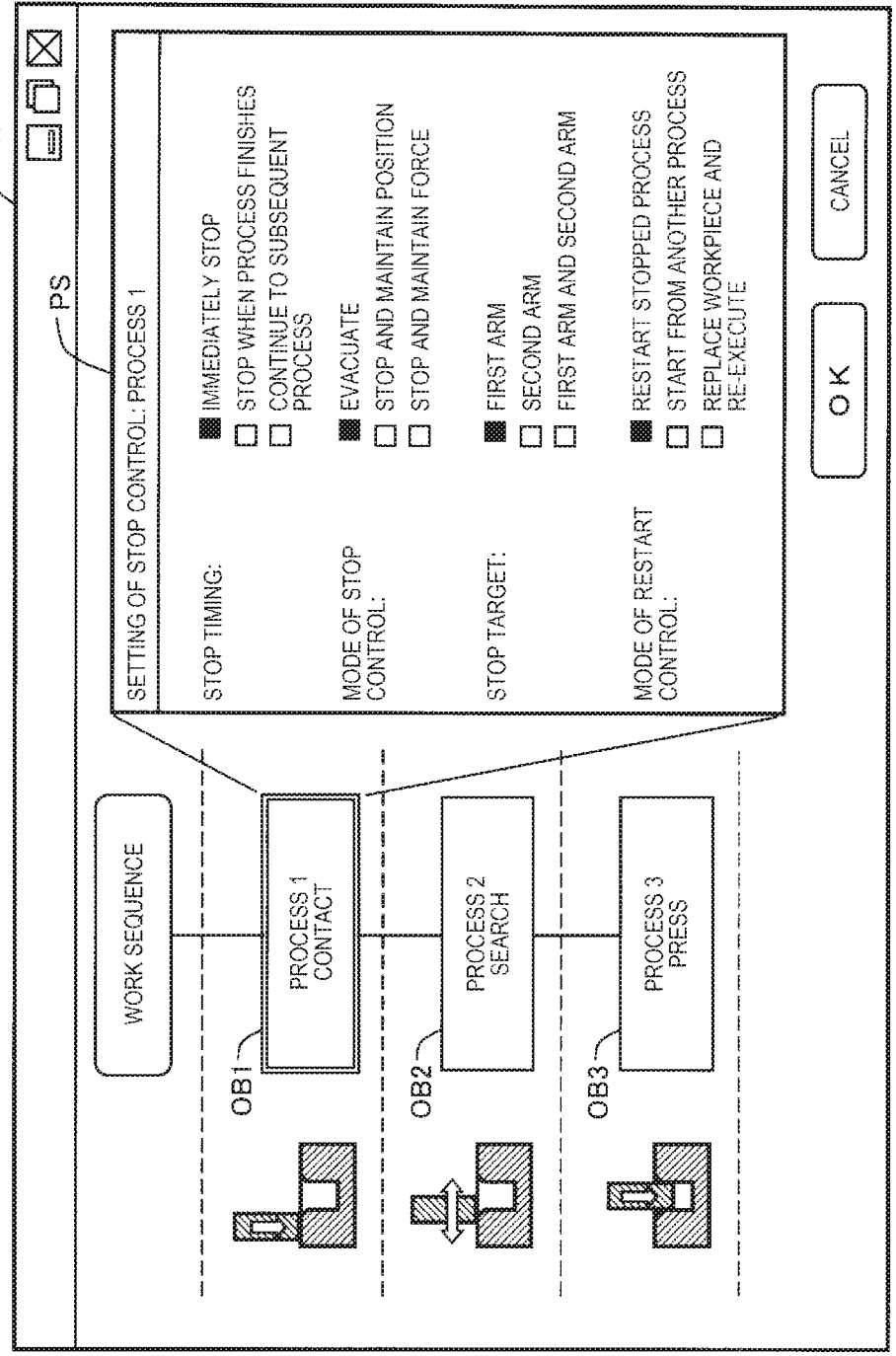
FIG. 14 is an explanatory diagram showing a setting window of stop control in the fifth embodiment.

FIG. 14 shows an example of a window W1 used in step S100. In this example, the entire work sequence is represented by objects OB1 to OB3 showing three processes of a contacting process, a probing process, and a pressing process. The contacting process is a force control process of moving the movable unit MU in a designated direction and stopping it when receiving reaction force. The probing process is a force control process of probing a position where the force in the designated direction becomes zero. The pressing process is a force control process of pressing with designated force in the designated direction. By sequentially executing these three processes, the first workpiece WK1 of FIG. 12 can be fitted into the second workpiece WK2. The designated direction and the target force in each process are separately set using a parameter setting window (not shown) or the like.

As the plurality of processes configuring the work sequence, any various processes such as a process of performing force control other than the impedance control or a process of performing position control without performing the force control can be used in addition to the force/position simultaneous control process described in the first to third embodiments and the force control process described in the fourth embodiment.

When one of the three objects OB1 to OB3 in the window W1 is selected, a setting area PS of the stop control related to the process indicated by the object is displayed. "Stop control" means the control executed in step S210a of FIG. 13.

In the setting area PS of the stop control, a plurality of items can be set respectively. Specifically, one of a plurality of options can be selected for four items of a stop timing, a stop control mode, a stop target, and a restart control mode.

(1) Example of Stop Timing Options

As options of the stop timing, for example, "immediate stop", "stop at the end of the process", and "continue the subsequent process" can be used.

"Immediate stop" means that the operation of the movable unit MU is immediately stopped by a set stop method when the stop condition is satisfied.

"Stop at the end of the process" means that even if the stop condition is satisfied, the process ends without stopping the operation of the movable unit MU in the process, the success or failure of the stop condition is determined again after the end of the process, and the movable unit MU is stopped by the set stop method when the stop condition is satisfied.

"Continue to the subsequent process" means that even if the stop condition is satisfied, the process ends without stopping the operation of the movable unit MU, and follows the setting of the stop control in the subsequent process in the process. For example, when the setting of the stop timing of the subsequent process is the "immediate stop", the stop condition is determined again at the start of the subsequent process, and the process is immediately stopped when the stop condition is satisfied. When the setting of the stop timing of the subsequent process is "stop at the end of the process", the stop condition is determined again after the end of the subsequent process, and stops after the end of the subsequent process when the stop condition is satisfied. When the setting of the stop timing of the subsequent process is "continue the subsequent process", the stop timing is determined according to the setting of the one after the subsequent process.

When the stop condition is satisfied and the stop of the operation is postponed according to the setting of the stop timing, the operation may be forcibly stopped if the operation continues for a predetermined time or more.

(2) Example of Options of Stop Control Mode

As the options of the stop control mode, "retract", "stop and maintain position", and "stop and maintain force" can be used.

"Retract" means moving the movable unit MU to a retraction position and stopping it.

The retraction position may be a position randomly set by a user, or may be set as a relative position from the position at the time of the start of the stop.

The retract operation may be performed by the position control, or may be performed using both force control and position control. For example, the movable unit MU may be retracted from the object OB according to a copying control in which the target force in a direction perpendicular to the retraction direction of the movable unit MU is smaller than the target force in the retraction direction. If the movable unit MU is retracted according to the copying control, it is possible to reduce the possibility of the occurrence of a defect such as damage on the object OB due to the retraction of the movable unit MU. Preferably, the target force in the direction perpendicular to the retraction direction of the movable unit MU may be zero.

"Stop and maintain position" means that the movable unit MU is stopped in place and remains at that position.

"Stop and maintain force" means stopping the movable unit MU at the place to maintain the designated target force. This is the same as the case where the target force is maintained at the same value as the first control before the stop in the second control executed in step S210 of FIG. 6 in the first embodiment. However, as described in the first embodiment, the target force in the second control may be set to a value different from the target force in the first control. In this case, a field in which the worker designates the target in the second control may be provided at the setting area PS in advance.

(3) Example of Options of Stop Target

As the options of the stop target, for example, "first arm", "second arm", and "first and second arms" can be used. Since the robot 100 described in FIGS. 1, 9, and 11 is a single-ram robot, only "first arm" can be selected. Since the robot 300 of FIG. 5 is a two-arm robot, any of three options can be selected.

(4) Example of Options of Restart Control Mode

As options of the restart control mode, for example, "restart the interrupted process", "start from another process", and "replace workpiece and re-execute" can be used.

"Restart the interrupted process" means, to restart the interrupted process from the position at which the movable unit MU is stopped.

When the movable unit MU is retracted at the time of stop, the movable unit MU may be returned to the stop start position before restarting the interrupted process, and the interrupted process may be resumed after reproducing the state of the force at the start of the stop. In this case, when the movable unit MU is stopped during the force control, since the movable unit MU and the object OB may be in a contact state at the stop start position, it is preferable to return while executing the force control when returning to the stop start position.

At the time of restart, it may be restarted after setting according to the speed of the movable unit MU at the time of stop.

When the target force is maintained at the time of stop, depending on the moving amount of the movable unit MU in the maintained state, it may restart from the place or it may restart after returning to the stop position.

"Start from another process" means to discard the interrupted process and start a different process. For the options, a field for setting another process may be provided at the setting area PS.

Another process may be the interrupted previous process, or may be a subsequent process of the interrupted process.

A process not continuous with the interrupted process such as returning to the first configuration of the work sequence may be selected as another process.

"Replace workpiece and re-execute" means replacing the old workpiece used in the interrupted process to a new workpiece and restarting the process.

The old workpiece may be retracted to a predetermined position. The retraction position may be designated by a relative distance from the stop position.

The setting of the stop control using the above-described window W1 and the setting area PS is merely an example, and various other settings can be used. However, as the setting of the stop control, it is preferable to use a setting including the combination of the stop timing, which is timing to start the stop control, and the stop control mode. As the stop control mode, it is preferable to select any of a plurality of modes including a first mode of controlling the movable unit MU by continuing the force control when the stop condition is satisfied and a second mode of controlling the movable unit MU with a control setting different from the first mode. As described above, there is an advantage that the stop control suitable for each process can be performed if a combination of the timing to start the stop control and the stop control mode when the stop condition is satisfied for each process is stored in advance and the stop control is executed according to the combination.

It is preferable that the plurality of modes of the stop control include a mode in which the movable unit MU is retracted from the object OB. In this way, since the movable unit MU is retracted from the object OB in the stop control, it is possible to reduce the possibility of the occurrence of a defect due to the interference or the like between the movable unit MU and the object OB. In this mode, the movable unit MU may be retracted from the object OB according to a copying control in which the target force in a direction perpendicular to the retraction direction of the movable unit MU is smaller than the target force of the retraction direction. In this way, since the movable unit MU is retracted according to the copying control, it is possible to reduce the possibility of the occurrence of a defect such as damage on the object OB due to the retraction of the movable unit MU.

In the example of FIG. 14, although only options for setting individual settings are drawn, this window W1 or another window may be used to enable separate input of parameters related to individual settings.

The setting of the stop control for each process may be automatically performed according to the content and the name of each process. Specifically, the "contacting process", the "probing process", and the "pressing process" exemplified in FIG. 14 each have predetermined operation content and are given unique names. About the stop control of these processes, predetermined initialization may be made. One or more items or options in the setting of the stop control may not be selected depending on the content of the process.

In this way, when the setting related to the stop control is performed in step S100 of FIG. 13, the setting content is stored in the memory 220. In the stop control of step S210b to be described later and the restart control of step S230b, setting related to the current process are read and used.

One process is selected in step S110, and the process is started in step S120. In step S130, it is determined whether or not the predetermined stop condition is satisfied. As a stop condition, as in the first embodiment, the following conditions 1 to 5 and the like and combinations thereof can be used.

Condition 1: the safety door DR is opened.
Condition 2: an emergency stop button (not shown) is pressed by the worker.
Condition 3: the worker issued a stop instruction to the control device 200.
Condition 4: the object detection unit 160 detected an object such as a person at a distance equal to or less than a predetermined distance threshold value.
Condition 5: the worker contacted the robot 100.

In the fifth embodiment, when the approach of an object is detected in the condition 4, a condition that the approach speed of the object is equal to or larger than a predetermined speed threshold value may be added. The condition may be a combination of the number of approach of the object and the time in the approach state. When the contact is detected in the condition 5, the condition may be a combination of the strength and the direction of the contact force, the number of contacts, the duration of contact, and the like. The setting of the stop control may be performed in step S100 so that the contents of the stop control may be different depending on the success or the failure of these detailed conditions.

A plurality of conditions may be set as different stop conditions for the same event. For example, as a condition for proximity detection of the condition 4, a first situation where the approach speed is equal to or larger than a first threshold value and a second situation having a value equal to or larger than a second threshold value larger than the first threshold value may be determined to be different from each other in the first situation and the second situation, and different modes may be selected as the stop control and the restart control mode. Furthermore, in addition to these, the position of the arm 110, the speed of the arm 110, the progress state of the process, the time until the next stop determination, and the like may be combined as the stop condition.

When the stop condition is not satisfied in step S130, the process proceeds to step S140b and proceeds to step S150 while continuing the control as it is. In step S150, it is determined whether or not the process is ended, and if it is not ended, the process returns to step S130.

When the stop condition is satisfied in step S130, the process proceeds to step S210b, and the stop control is executed according to the stop timing, the stop control mode, and the stop target set in step S100. In the stop timing described in FIG. 14, "stop at the end of the process" and "continue the subsequent process" are options. However, in the flowchart of FIG. 13, for the convenience of illustration, the steps are arranged in the same order as in the case of "immediate stop".

In step S220, it is determined whether or not a predetermined restart condition is satisfied. If the restart condition is not satisfied, the process proceeds to step S240b to maintain the control at the time of stop, and the process proceeds to step S220. On the other hand, if the restart condition is satisfied, the process proceeds to step S230b, and the control is restarted according to the restart control mode set in step S100. After the restart, the process proceeds to step S150 and it is determined whether or not the process is ended.

As described above, in the fifth embodiment, for each of the plurality of processes included in the work sequence, a combination of the stop timing and the stop control mode when the stop condition is satisfied is stored in the memory 220, and the movable unit MU is controlled according to the combination when the stop condition is satisfied. Therefore, it is possible to execute the stop control suitable for each process.

F. Other Embodiments

The present disclosure is not limited to the above-described embodiments, and can be realized in various forms without departing from the gist thereof. For example, the present disclosure can also be realized by the following aspect. The technical features in the embodiments corresponding to the technical features in each aspect described above can be replaced or combined as appropriate to solve part or all of the above-mentioned problems of the present disclosure, or to achieve some or all of the above-mentioned effects of the present disclosure. Also, unless its technical features are described as essential in this specification, it can be deleted as appropriate.

(1) According to a first aspect of the present disclosure, there is provided a control device that controls a robot provided with a movable unit and a force detection unit which detects a force applied to the movable unit from an object in contact with the movable unit. The control device includes a control unit which executes a force control to the movable unit according to the output of the force detection unit, the control unit executes a stop control of the movable unit when a predetermined stop condition is satisfied, and the stop control includes a second control which controls the movable unit by continuing the force control when the stop condition is satisfied during the execution of a first control including the force control.

According to the control device, since the movable unit is controlled by continuing the force control when the stop control is satisfied during the execution of the first control including the force control, it is possible to reduce the occurrence of a defect when a work during the execution of the force control is stopped.

(2) In the control device, the force control may be an impedance control using a virtual inertia coefficient and a virtual viscosity coefficient, the virtual inertia coefficient of the second control may be larger than the virtual inertia coefficient of the first control, and the virtual viscosity coefficient of the second control may be larger than the virtual viscosity coefficient of the first control.

According to the control device, since the virtual inertia coefficient and the virtual viscosity coefficient of the second control are larger than those of the first control, it is possible to lower the responsiveness of the change in position of the movable unit with respect to the fluctuation between the movable unit and the object in the second control, and it is possible to reduce the possibility of occurrence of a defect due to large change in the position of the movable unit.

(3) In the control device, the movable unit may have a contact portion coming into contact with the object, and when a moving amount of the contact portion in the second control is equal to or larger than a predetermined threshold value, the control unit may end the second control and maintain a position of the movable unit.

According to the control device, since the second control ends to maintain the position of the movable unit when the moving amount of the contact portion is equal to or larger than the threshold value in the second control, it is possible to reduce the possibility of the occurrence of a defect due to the moving amount of the contact portion.

(4) In the control device, a work sequence of the robot may include a plurality of processes using the force control, the control unit may be configured to select a stop control mode including a first mode including the second control and a second mode for controlling the movable unit according to a control setting different from the second control, and the movable unit may be controlled according to a combination of the stop control mode and a timing to start the stop control predetermined for each of the plurality of processes when the stop condition is satisfied.

According to the control device, since the stop control is executed according to the preset combination of the timing to start the stop control and the stop control mode when the stop condition is satisfied for each of the processes, it is possible to execute the stop control suitable for each of the processes.

(5) In the control device, the stop control mode may include a third mode for executing a third control to retract the movable unit from the object.

According to the control device, since the movable unit is retracted from the object in the stop control, it is possible to reduce the possibility of the occurrence of a defect due to the interference or the like between the movable unit MU and the object OB.

(6) In the control device, the control unit may retract the movable unit from the object according to a copying control in which a target force in a direction perpendicular to a retraction direction of the movable unit is smaller than the target force of the retraction direction in the third control.

According to the control device, since the movable unit is retracted according to the copying control, it is possible to reduce the possibility of the occurrence of a defect such as damage on the object due to the retraction of the movable unit.

(7) In the control device, the timing to start the stop control may include an end time of the process.

According to the control device, since the work does not stop until the process ends even if the stop condition is satisfied, it is possible to reduce the possibility of the occurrence of a defect by stopping during the execution of the work.

(8) In the control device, the timing to start the stop control may include a start timing of a stop control set for a subsequent process of the process in which the stop condition is satisfied.

According to the control device, since the stop control is performed at the start timing set in the subsequent process when it is inappropriate to stop the work in the process in which the stop condition is satisfied, stop control can be executed at more appropriate timing.

(9) In the control device, the combination may include a restart control mode for restarting a process interrupted by the stop control.

According to the control device, since the restart control mode at the time of restarting the process interrupted by the stop control is stored in advance, it is possible to execute a restart control suitable for each of the processes.

(10) In the control device, the restart control mode may include a mode restarting from a process different from the process interrupted by the stop control.

According to the control device, when the defect occurs if the process restarts from the interrupted process, it is possible to reduce the possibility of the occurrence of a defect by restarting from a different process.

(11) According to a second aspect of the present disclosure, there is provided a robot system. The robot system includes a robot provided with a movable unit and a force detection unit which detects a force applied to the movable unit from an object in contact with the movable unit and the above-described control device.

According to the robot system, since the movable unit is controlled by continuing the force control when the stop condition is satisfied after the movable unit is stopped as the stop condition is satisfied during the execution of the first control including the force control, it is possible to reduce the possibility of the occurrence of a defect when the work is stopped during the execution of the force control.

(12) According to a third aspect of the present disclosure, there is provided a robot. The robot includes a force detection unit detecting a force applied to the robot from an object and a movable unit in which the force control is applied according to an output of the force detection unit, in which the movable unit is controlled in a state in which an operation is stopped when a predetermined stop condition is satisfied during an execution of the force control and the force control is continued when the stop condition is satisfied after the stop.

According to the robot, since the movable unit is controlled by continuing the force control when the stop condition is satisfied after the stop condition is satisfied during the execution of the force control and the movable unit is stopped, it is possible to reduce the possibility of the occurrence of a defect when the work is stopped during the execution of the force control.

The present disclosure can be realized in various aspects other than the described above. For example, it can be realized in aspects of a robot, a robot system provided with a robot control device, a computer program for realizing functions of the robot control device, a non-transitory storage medium storing the computer program, and the like.

What is claimed is:

1. A control device that controls a robot provided with a movable unit and a force detection unit which detects a force applied to the movable unit from an object in contact with the movable unit, the control device comprising:
a control unit which executes a force control to the movable unit according to an output of the force detection unit, wherein
the control unit executes a stop control of the movable unit when a predetermined stop condition is satisfied, and
the stop control includes a second control which controls the movable unit by continuing the force control when the stop condition is satisfied during the execution of a first control including the force control,
wherein the predetermined stop condition is at least one of:
an opened safety door;
an activated emergency stop button;
a received stop instruction;
an object detected within a redetermined threshold distance; and
a worker contacted the robot, and
wherein the movable unit has a contact portion coming into contact with the object, and
when a moving amount of the contact portion in the second control is equal to or larger than a predetermined threshold value, the control unit ends the second control and maintains a position of the movable unit.

2. The control device according to claim 1, wherein
the force control is an impedance control using a virtual inertia coefficient and a virtual viscosity coefficient, and
the virtual inertia coefficient of the second control is larger than the virtual inertia coefficient of the first control, and the virtual viscosity coefficient of the second control is larger than the virtual viscosity coefficient of the first control.

3. A control device that controls a robot provided with a movable unit and a force detection unit which detects a force applied to the movable unit from an object in contact with the movable unit, the control device comprising;
a control unit which executes a force control to the movable unit according to an output of the force detection unit, wherein
the control unit executes a stop control of the movable unit when a predetermined stop condition is satisfied, and
the stop control includes a second control which controls the movable unit by continuing the force control when the stop condition is satisfied during the execution of a first control including the force control,
wherein the predetermined stop condition is at least one of:
an opened safety door;
an activated emergency stop button;
a received stop instruction;
an object detected within a predetermined threshold distance; and
a worker contacted the robot, and
wherein a work sequence of the robot includes a plurality of processes using the force control,
the control unit is configured to select a stop control mode including a first mode including the second control and a second mode for controlling the movable unit according to a control setting different from the second control, and
the movable unit is controlled according to a combination of the stop control mode and a timing to start the stop control predetermined for each of the plurality of processes when the stop condition is satisfied.

4. The control device according to claim 3, wherein
the stop control mode includes a third mode for executing a third control to retract the movable unit from the object.

5. The control device according to claim 4, wherein
the control unit retracts the movable unit from the object according to a copying control in which a target force in a direction perpendicular to a retraction direction of the movable unit is smaller than the target force of the retraction direction in the third control.

6. The control device according to claim 3, wherein
the timing to start the stop control includes an end time of the process.

7. The control device according to claim 3, wherein
the timing to start the stop control includes a start timing of a stop control set for a subsequent process of the process in which the stop condition is satisfied.

8. The control device according to claim 3, wherein
the combination includes a restart control mode for restarting a process interrupted by the stop control.

9. The control device according to claim 8, wherein
the restart control mode includes a mode restarting from a process different from the process interrupted by the stop control.

10. A robot system comprising:

a robot provided with a movable unit and a force detection unit which detects a force applied to the movable unit from an object in contact with the movable unit; and the robot control device according to claim 1.

11. A robot comprising:

a force detection unit detecting a force applied to the robot from an object; and a movable unit in which a force control is applied according to an output of the force detection unit, wherein the movable unit is controlled in a state in which an operation is stopped when a predetermined stop condition is satisfied during an execution of the force control and the force control is continued when the stop condition is satisfied after the stop, wherein the movable unit has a contact portion coming into contact with the object, and when a moving amount of the contact portion in the second control is equal to or larger than a predetermined threshold value, the control unit ends the second control and maintains a position of the movable unit.

* * * * *